United States Patent
Nakane et al.

(10) Patent No.: US 7,842,751 B2
(45) Date of Patent: Nov. 30, 2010

(54) WATER-BASED PAINT COMPOSITIONS

(75) Inventors: Noritoshi Nakane, Hiratsuka (JP);
Yoshiyuki Yukawa, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 119 days.

(21) Appl. No.: 12/226,268

(22) PCT Filed: Apr. 5, 2007

(86) PCT No.: PCT/JP2007/058022

§ 371 (c)(1),
(2), (4) Date: Oct. 14, 2008

(87) PCT Pub. No.: WO2007/119762

PCT Pub. Date: Oct. 25, 2007

(65) Prior Publication Data

US 2009/0305050 A1    Dec. 10, 2009

(30) Foreign Application Priority Data

Apr. 13, 2006   (JP)   ............................... 2006-111412

(51) Int. Cl.
*C08F 236/10*   (2006.01)
(52) U.S. Cl. .................... 524/577; 524/504; 523/201
(58) Field of Classification Search ................ 523/201; 524/504

See application file for complete search history.

(56) References Cited

U.S. PATENT DOCUMENTS

| | | | | |
|---|---|---|---|---|
| 4,900,774 A * | 2/1990 | Mitsuji et al. | ................ | 524/512 |
| 5,539,049 A | 7/1996 | Kajima et al. | | |
| 5,596,047 A * | 1/1997 | Wu et al. | ................... | 525/375 |
| 6,765,049 B2 * | 7/2004 | Lorah et al. | .................. | 524/445 |
| 2004/0059022 A1 * | 3/2004 | Tsukiyama et al. | ......... | 523/201 |
| 2004/0068043 A1 * | 4/2004 | Tsukiyama | ................. | 524/523 |
| 2006/0135651 A1 | 6/2006 | Nakane et al. | | |
| 2007/0237903 A1 * | 10/2007 | Hiwara et al. | ............ | 427/407.1 |

FOREIGN PATENT DOCUMENTS

| | | |
|---|---|---|
| JP | 63-193968 | 8/1988 |
| JP | 07-41729 | 2/1995 |
| JP | 07-207220 | 8/1995 |
| JP | 2000-154204 | 6/2000 |
| JP | 2002-308993 | 10/2002 |
| JP | 2002308993 A * | 10/2002 |
| JP | 2005-343966 | 12/2005 |
| JP | 2006-176618 | 7/2006 |
| WO | 2006/009219 | 1/2006 |
| WO | WO 2006009219 A1 * | 1/2006 |

OTHER PUBLICATIONS

JP 2002308993 A, Oct. 2002, Yoshio et al., Machine translation.*
International Search Report mailed Jun. 5, 2007 in the International (PCT) Application of which the present application is the U.S. National Stage.
International Preliminary Report on Patentability issued on Nov. 17, 2008 in the International (PCT) Application of which the present application is the U.S. National Stage.

* cited by examiner

*Primary Examiner*—Satya B Sastri
(74) *Attorney, Agent, or Firm*—Wenderoth, Lind & Ponack, L.L.P.

(57) ABSTRACT

This invention provides a water-based paint composition comprising an emulsion resin (A), melamine resin (B) and hydrophobic solvent (C), the emulsion resin (A) being fine resin particles having core/shell type multilayered structure composed of the core made of a copolymer (I) obtained by copolymerization of 0.1-30 mass % of polymerizable unsaturated monomer (a) having at least two polymerizable unsaturated groups per molecule and 70-99.9 mass % of other polymerizable unsaturated monomer (b), and the shell made of a copolymer (II) obtained by copolymerization of 5-50 mass % of vinyl aromatic compound (c) and 50-95 mass % of other polymerizable unsaturated monomer (d), the solid mass ratio of the copolymer (I)/copolymer (II) being within a range of 10/90-90/10; the melamine resin (B) having a weight-average molecular weight within a range of 1,000-5,000; and containing, per 100 mass parts of solid resin content in the water-based paint composition, the emulsion resin (A) within a range of 10-80 mass parts, the melamine resin (B), within a range of 5-50 mass parts, and the hydrophobic solvent (C), within a range of 10-100 mass parts. Use of the water-based paint composition allows formation of coating film free of metallic mottling and excelling in flip-flop property, smoothness, luster and water resistance.

18 Claims, No Drawings

WATER-BASED PAINT COMPOSITIONS

TECHNICAL FIELD

This invention relates to water-based paint compositions and coating film-forming methods using the water-based paint compositions.

BACKGROUND ART

Water-based paint formulated by blending base resin such as acrylic resin or polyester resin having hydrophilic functional groups such as hydroxyl group, carboxyl group and the like, with melamine resin as crosslinking agent has heretofore been frequently used as intermediate coat, top coat or the like for coating outer panels of automobiles.

As the melamine resin, conventionally relatively low molecular weight water-soluble melamine resins excelling in water dispersibility have been dominantly used, but investigations for using hydrophobic melamine resins having relatively high molecular weight are being made recently. Water-based paint in which hydrophobic melamine resin is used as the crosslinking agent has an advantage to provide coating film of better performance such as water resistance, compared to water-based paint containing water-soluble melamine resin as the crosslinking agent, but in certain cases is inferior in storage stability or coating film appearance. Solution of this problem is held to be a subject for further studies.

With the view to solve the problem, JP 2002-308993A discloses an aqueous resin dispersion containing a reaction product obtained by heat-treating specific acrylic resin, hydrophobic melamine resin and polyester resin under specific conditions excels in storage stability and can form coating film excelling in finished appearance, water resistance and the like. When the aqueous resin dispersion is blended with effect pigment such as aluminum flake, mica and the like and used as water-based metallic base coat paint, however, there rises a problem that the formed coating film may develop metallic mottling or shows inferior flip-flop property or smoothness.

JP Sho 63 (1988)-193968A discloses a water-based coating composition containing a crosslinking agent formed by dispersing hydrophobic melamine resin in water in the presence of water-soluble resin gives a water-based base coat paint composition exhibiting high storage stability and favorable coating workability, being free of such defect as sagging, unevenness or the like over broad humidity range. Whereas, coating film formed of the water-based coating composition is subject to a problem of inferior smoothness.

Furthermore, JP Hei 7 (1995)-41729A discloses that an aqueous resin dispersion prepared by dispersing graft resin and hydrophobic melamine resin in an aqueous medium excels in storage stability, heat stability, mechanical stability and the like. Coating film formed of water-based paint composition containing the aqueous resin dispersion, however, has the problem of tending to develop metallic mottling and being inferior in flip-flop property or smoothness, failing to provide satisfactory coating film appearance.

DISCLOSURE OF THE INVENTION

The object of the present invention is to provide water-based paint compositions which are capable of forming coating film free of metallic mottling and excelling in flip-flop property, smoothness and water resistance, and methods for forming coating film, using the water-based paint compositions.

Aiming at accomplishing the above object, we have engaged in concentrative studies to now discover that a water-based paint composition comprising a specific core/shell type emulsion resin having crosslinked core and hydrophobic shell, high molecular weight melamine resin and a relatively large amount of hydrophobic solvent forms coating film excelling in flip-flop property, smoothness and water resistance, without causing defective appearance such as metallic mottling. The present invention is whereupon completed.

Thus, the present invention provides a water-based paint composition characterized by comprising an emulsion resin (A), melamine resin (B) and hydrophobic solvent (C), the emulsion resin (A) being fine resin particles having core/shell type multilayered structure composed of the core made of a copolymer (I) obtained by copolymerization of 0.1-30 mass % of polymerizable unsaturated monomer (a) having at least two polymerizable unsaturated groups per molecule and 70-99.9 mass % of other polymerizable unsaturated monomer (b), and the shell made of a copolymer (II) obtained by copolymerization of 5-50 mass % of vinyl aromatic compound (c) and 50-95 mass % of other polymerizable unsaturated monomer (d), the solid mass ratio of the copolymer (I)/copolymer (II) being within a range of 10/90-90/10;

the melamine resin (B) having a weight-average molecular weight within a range of 1,000-5,000; and containing, per 100 mass parts of solid resin content in the water-based paint composition, the emulsion resin (A) within a range of 10-80 mass parts, the melamine resin (B), within a range of 5-50 mass parts, and the hydrophobic solvent (C), within a range of 10-100 mass parts.

The invention also provides methods of forming multilayer coating film, which are characterized by applying above water-based paint composition onto a coating object, applying onto the resulting uncured coating film a clear paint, and thereafter heating to cure the two-layered coating film simultaneously.

According to the multilayer coating film-forming method using a water-based paint composition following the present invention, multilayer coating film free of metallic mottling and excelling in flip-flop property, smoothness and water resistance can be formed.

The reason why the use of the water-based paint compositions of the present invention enables to form coating film free of metallic mottling and excelling in flip-flop property and smoothness is not fully clear, but we infer that the emulsion resin (A) maintains stable configuration in the paint because of the crosslinked core portion, and an interaction occurs among the vinyl aromatic compound (c) present in the shell portion of the emulsion resin (A), relatively high molecular weight melamine resin (B) and the hydrophobic solvent (C), which gives rise to suitable viscosity behavior in the water-based paint compositions of the invention for producing the excellent coating film appearance.

Hereinafter the water-based paint compositions and coating methods using them, as provided by the present invention are explained in further details.

Emulsion Resin (A):

Emulsion resin refers to fine resin particles emulsion-dispersed in an aqueous medium, and the emulsion resin (A) used in this invention is composed of fine resin particles having a core/shell type multilayer structure consisting of the core portion made of copolymer (I) obtained by copolymerizing 0.1-30 mass % of a polymerizable unsaturated monomer (a) having at least two polymerizable unsaturated groups per molecule and 70-99.9 mass % of other polymerizable unsaturated monomer (b), and the shell portion made of copolymer (II) obtained by copolymerizing 5-50 mass % of vinyl aromatic compound (c) and 50-95 mass % of other polymerizable unsaturated monomer (d), the solid mass ratio of the copolymer (I)/copolymer (II) being within a range of 10/90-90/10.

Examples of the polymerizable unsaturated monomer (a) having at least two, preferably two or three, inter alia two, polymerizable unsaturated groups per molecule include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate diallyl terephthalate, divinylbenzene and the like, which can be used either alone or in combination of two or more. In particular, polymerizable unsaturated monomers (a) containing amido group in addition to polymerizable unsaturated groups are preferred, and as such polymerizable unsaturated monomer, for example, methylenebis(meth)acrylamide, ethylenebis (meth)acrylamide and the like can be named.

In the present invention, "(meth)acrylate" means either one of acrylate or methacrylate.

Other polymerizable unsaturated monomer (b) is a monomer having polymerizable unsaturated group(s) copolymerizable with the polymerizable unsaturated monomer (a), and includes the compounds having one polymerizable unsaturated group, such as vinyl group, (meth)acryloyl group and the like, per molecule.

Specific examples of the other polymerizable unsaturated monomer (b) include alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, n-hexyl (meth)acrylate, n-octyl (meth)acrylate, 2-ethylhexyl (meth) acrylate, nonyl (meth)acrylate, tridecyl (meth)acrylate, lauryl (meth)acrylate, stearyl (meth)acrylate, Isostearyl Acrylate (tradename, Osaka Organic Chemical Industry, Ltd.), cyclohexyl (meth)acrylate, methylcyclohexyl (meth)acrylate, t-butylcyclohexyl (meth)acrylate, cyclododecyl (meth)acrylate and the like; isobornyl group-containing polymerizable unsaturated monomers such as isobornyl (meth)acrylate; adamantyl group-containing polymerizable unsaturated monomers such as adamantyl (meth)acrylate; vinyl aromatic compounds such as styrene, α-methylstyrene, vinyltoluene and the like; alkoxysilyl group-containing polymerizable unsaturated monomers such as vinyltrimethoxysilane, vinyltriethoxysilane, vinyltris (2-methoxyethoxy)silane, γ-(meth) acryloyloxypropyltrimethoxysilane, γ-(meth) acryloyloxypropyltriethoxysilane and the like; perfluoroalkyl (meth)acrylates such as perfluorobutylethyl (meth)acrylate, perfluorooctylethyl (meth)acrylate and the like; polymerizable unsaturated monomers having fluorinated alkyl groups such as fluoroolefin; polymerizable unsaturated monomers having photo-polymerizable functional groups such as maleimide group; vinyl compounds such as N-vinylpyrrolidone, ethylene, butadiene, chloroprene, vinyl propionate, vinyl acetate and the like; carboxyl group-containing polymerizable unsaturated monomers such as (meth)acrylic acid, maleic acid, crotonic acid, β-carboxyethyl acrylate and the like; nitrogen-containing polymerizable unsaturated monomers such as (meth)acrylonitrile, (meth)acrylamide, N,N-dimethylaminoethyl (meth)acrylate, N,N-dimethylaminopropyl (meth)acrylamide, adducts of glycidyl (meth) acrylates with amines and the like; hydroxyl group-containing polymerizable unsaturated monomers such as monoesters of (meth)acrylic acid with $C_{2-8}$ dihydric alcohols such as 2-hydroxyethyl (meth)acrylate, 2-hydroxypropyl (meth)acrylate, 3-hydroxypropyl (meth)acrylate, 4-hydroxybutyl (meth)acrylate and the like, ε-caprolactone-modified products of the monoesters of (meth)acrylic acid with $C_{2-8}$ dihydric alcohols, N-hydroxymethyl (meth)acrylamide, allyl alcohol, (meth)acrylates having a polyoxyethylene chain with hydroxyl group at the molecular terminus, and the like; epoxy group-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allylglycidyl ether and the like; (meth)acrylates having a polyoxyethylene chain with alkoxy group at the molecular terminus; polymerizable unsaturated monomers having sulfonic acid group, such as 2-acrylamido-2-methylpropanesulfonic acid, allylsulfonic acid, sodium salt of styrenesulfonic acid, sulfoethyl methacrylate and their sodium salts or ammonium salts; polymerizable unsaturated monomers having phosphoric acid group, such as 2-acryloyloxyethyl acid phosphate, 2-methacryloyloxyethyl acid phosphate, 2-acryloyloxypropyl acid phosphate, 2-methacryloyloxypropyl acid phosphate and the like; polymerizable unsaturated monomers having ultraviolet ray-absorbing functional group, such as 2-hydroxy-4-(3-methacryloyloxy-2-hydroxypropoxy)benzophenone, 2-hydroxy-4-(3-acryloyloxy-2-hydroxypropoxy)benzophenone 2,2'-dihydroxy-4-(3-methacryloyloxy-2-hydroxypropoxy)benzophenone, 2,2'-dihydroxy-4-(3-acryloyloxy-2-hydroxypropoxy)benzophenone, 2-(2'-hydroxy-5'-methacryloyloxyethylphenyl)-2H-benzotriazole and the like; ultraviolet ray-stable polymerizable unsaturated monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth) acryloylamino-2,2,6,6-tetramethylpiperidine, 1-(meth) acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine and the like; carbonyl group-containing polymerizable unsaturated monomeric compounds such as acrolein, diacetoneacrylamide, diacetonemethacrylamide, acetoacetoxyethyl methacrylate, formylstyrol, $C_{4-7}$ vinyl alkyl ketones (e.g., vinyl methyl ketone, vinyl ethyl ketone, vinyl butyl ketone); and the like. These can be used either alone or in combination of two or more.

In the occasion of making the copolymer (I), polymerizable unsaturated monomer (a) can be used within a range of 0.1-30 mass %, preferably 0.5-10 mass %, inter alia, 1-4 mass %, based on the combined mass of the polymerizable unsaturated monomer (a) and other polymerizable unsaturated monomer (b); and the other polymerizable unsaturated monomer (b), within a range of 70-99.9 mass %, preferably 90-99.5 mass %, inter alia, 96-99 mass %, based on the combined mass of the polymerizable unsaturated monomer (a) and other polymerizable unsaturated monomer (b).

Examples of the vinyl aromatic compound (c) include styrene, α-methylstyrene, 2-vinyltoluene, divinylbenzene, vinylnaphthalene and the like, styrene being particularly preferred. These can be used either alone or in combination of two or more.

Other polymerizable unsaturated monomer (d) is a monomer having polymerizable unsaturated group which is copolymerizable with the vinyl aromatic compound (c), and includes those compounds having one polymerizable unsaturated group such as vinyl group, (meth)acryloyl group and the like, per molecule.

Specific examples of other polymerizable unsaturated monomer (d) include alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, n-hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, Isostearyl Acrylate (tradename, Osaka Organic Chemical Industry, Ltd.), cyclohexyl (meth)acrylate, methylcyclohexyl (meth)acrylate, t-butylcyclohexyl (meth)acrylate, cyclododecyl (meth)acrylate and the like; carboxyl group-containing polymerizable unsaturated-monomers (e) such as (meth)acrylic acid, maleic acid, crotonic acid, β-carboxyethyl acrylate and the like; and hydroxyl group-containing polymerizable unsaturated monomers (f) such as monoesters of (meth)acrylic acid with $C_{2-8}$ dihydric alcohols such as 2-hydroxyethyl (meth)acrylate, 2-hydroxypropyl (meth)acrylate, 3-hydroxypropyl (meth)acrylate, 4-hydroxybutyl (meth)acrylate and the like, ε-caprolactone-modified products of the monoesters of (meth)acrylic acid with $C_{2-8}$ dihydric alcohols, N-hydroxymethyl (meth)acrylamide, allyl alcohol, (meth)acrylates having a polyoxyethylene chain with hydroxyl group at the molecular terminus, and the like. These can be used either alone or in combination of two or more.

In the preparation of the copolymer (II), the vinyl aromatic compound (c) can be used within a range of 5-50 mass %, preferably 7-40 mass %, inter alia, 9-30 mass %, based on the combined mass of the vinyl aromatic compound (c) and other polymerizable unsaturated monomer (d); and the other polymerizable unsaturated monomer (d), within a range of 50-95 mass %, preferably 60-93 mass %, inter alia, 70-91 mass %, based on the combined mass of the vinyl aromatic compound (c) and other polymerizable unsaturated monomer (d).

The other polymerizable unsaturated monomer (d) preferably contains, as at least a part of its components, above-named carboxyl group-containing polymerizable unsaturated monomer (e), for securing stability of resulting emulsion resin in the aqueous medium. Among the above exemplified, acrylic acid and methacrylic acid are particularly preferred as the carboxyl group-containing polymerizable unsaturated monomer (e).

The use amount of such carboxyl group-containing polymerizable unsaturated monomer (e) can be generally within a range of 1-40 mass %, preferably 6-25 mass %, inter alia, 7-19 mass %, based on the combined mass of the vinyl aromatic compound (c) and other polymerizable unsaturated monomer (d), from the viewpoints of stability of the emulsion resin in the aqueous medium and water resistance of formed coating film.

The other polymerizable unsaturated monomer (d) preferably also contains, as at least a part of its components, above-named hydroxyl group-containing polymerizable unsaturated monomer (f), for securing stability of resulting emulsion resin in the aqueous medium. Among those exemplified, 2-hydroxyethyl (meth)acrylate, 2-hydroxypropyl (meth)acrylate, 3-hydroxypropyl (meth)acrylate and 4-hydroxybutyl (meth)acrylate are particularly preferred as the hydroxyl group-containing polymerizable unsaturated monomer (f), which can be used either alone or in combination of two or more.

The use amount of the hydroxyl group-containing polymerizable unsaturated monomer (f) can be generally within a range of 1-40 mass %, preferably 6-25 mass %, inter alia, 7-20 mass %, based on the combined mass of the vinyl aromatic compound (c) and other polymerizable unsaturated monomer (d), from the viewpoints of stability of the emulsion resin in the aqueous medium and water resistance of resulting coating film.

Furthermore, the other polymerizable unsaturated monomer (d) preferably contains, as at least a part of its components, alkyl (meth)acrylate (g) having $C_{2-4}$ alkyl group. As the alkyl (meth)acrylate (g), for example, ethyl (meth)acrylate, n-propyl (meth)acrylate, i-propyl (meth)acrylate, n-butyl (meth)acrylate, i-butyl (meth)acrylate, tert-butyl (meth)acrylate and the like can be named, among which n-butyl (meth)acrylate is preferred.

The use amount of such alkyl (meth)acrylate (g) can be generally within a range of 15-93 mass %, preferably 30-75 mass %, inter alia, 40-60 mass %, based on the combined mass of the vinyl aromatic compound (c) and other polymerizable unsaturated monomer (d).

From the viewpoints of flip-flop property, metallic mottling and smoothness of resulting coating film, the copolymer (II) preferably is the product of copolymerizing 9-25 mass % of the vinyl aromatic compound (c), 6-25 mass % of the carboxyl group-containing polymerizable unsaturated monomer (e), 5-20 mass % of the hydroxyl group-containing polymerizable unsaturated monomer (f) and 30-80 mass % of the alkyl (meth)acrylate (g), based on the total mass of the used monomers.

It is convenient for the emulsion resin (A) to have an acid value within a range of generally 5-90 mgKOH/g, in particular, 8-50 mgKOH/g, inter alia, 10-35 mgKOH/g, from the viewpoint of storage stability and water resistance of resulting coating film.

From the viewpoint of water resistance of the coating film, the emulsion resin (A) also preferably has a hydroxyl value within a range of generally 1-70 mgKOH/g, in particular, 2-50 mgKOH/g, inter alia, 5-30 mgKOH/g.

Furthermore, for excellent appearance of the coating film, it is desirable to use as the vinyl aromatic compound (c) and other polymerizable unsaturated monomer (d) polymerizable unsaturated monomers having only one polymerizable unsaturated group per molecule, to render the shell portion of the emulsion resin (A) uncrosslinked.

The emulsion resin (A) can be obtained by adding to emulsion (I), which is obtained by emulsion polymerization of the monomeric mixture (I) of the polymerizable unsaturated monomer (a) and other polymerizable unsaturated monomer (b) at the earlier specified quantitative ratio, the monomeric mixture (II) of the aromatic vinyl compound (c) and other polymerizable unsaturated monomer (d) at the earlier specified quantitative ratio, and further carrying out the emulsion polymerization.

Emulsion polymerization of the monomeric mixture (I) can be carried out by any means known per se, for example, using a polymerization initiator in the presence of an emulsifier.

As the emulsifier, anionic or nonionic emulsifiers are suitable. Examples of anionic emulsifier include sodium salts or ammonium salts of such acids as alkylsulfonic acid, alkylbenzenesulfonic acid, alkylphosphoric acid and the like, and examples of nonionic emulsifier include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, polyoxyethylene sorbitan monolaurate and the like.

It is also permissible to use polyoxyalkylene group-containing anionic emulsifier containing an anionic group and polyoxyalkylene group such as polyoxyethylene, polyoxypropylene or the like group per molecule, or reactive anionic emulsifier containing an anionic group and radical-polymerizable unsaturated group per molecule. Of these, use of reactive anionic emulsifier is preferred.

Examples of the reactive anionic emulsifier include sodium salts or ammonium salts of sulfonic acid compounds having radical-polymerizable unsaturated groups such as (meth)allyl, (meth)acryloyl, propenyl, butenyl and the like groups. In particular, ammonium salts of radical-polymerizable unsaturated group-containing sulfonic acid compounds are preferred from the viewpoint of providing coating film of excellent water resistance. As commercially available ammonium salt of such a sulfonic acid compound, for example, LATEMUL S-180A (tradename, Kao Corporation) can be named.

Of ammonium salts of radical-polymerizable unsaturated group-containing sulfonic acid compounds, ammonium salts of sulfonic acid compounds having radical-polymerizable unsaturated group and polyoxyalkylene group are particularly preferred. As commercially available ammonium salts of sulfonic acid compound having radical-polymerizable unsaturated group and polyoxyalkylene group, for example, AQUALON KH-10 (tradename, Daiichi Kogyo Seiyaku Co., Ltd.) and SR-1025A (tradename, Asahi Denka Co., Ltd.) can be named.

The emulsifier can be used within a range of normally 0.1-15 mass %, preferably 0.5-10 mass %, inter alia, 1-5 mass %, based on the total mass of all of the monomers used.

The polymerization initiator may be either type of oil-soluble or water-soluble. Examples of oil-soluble polymerization initiator include organic peroxides such as benzoyl peroxide, octanoyl peroxide, lauroyl peroxide, stearoyl peroxide and the like; and azo compounds such as azobisisobutyronitrile, azobis(2,4-dimethylvarelonitrile) and the like. Examples of water-soluble initiator include organic peroxides such as cumene hydroperoxide, tert-butyl peroxide, tert-butyl peroxylaurate, tert-butyl peroxyisopropylcarbonate, tert-butyl peroxyacetate, diisopropylbenzene hydroperoxide and the like; azo compounds such as azobis(2-methylpropionitrile), azobis(2-methylbutyronitrile), 4,4'-azobis(4-cyanobutanoic acid), dimethylazobis(2-methyl propionate), azobis[2-methyl-N-(2-hydroxyethyl)-propionamide], azobis{2-methyl-N-[2-(1-hydroxybutyl)]-propionamide} and the like; and persulfates such as potassium persulfate, ammonium persulfate, sodium persulfate and the like. These can be used either alone or in combination of two or more. Furthermore, where necessary, such a polymerization initiator may be co-used with reducing agent such as sugar, sodium formaldehyde sulfoxylate, iron complex and the like to form a redox polymerization system.

The polymerization initiator is preferably used within a range of generally 0.1-5 mass %, in particular, 0.2-3 mass %, based on the total mass of all of the monomers used. Method of adding the polymerization initiator is not particularly limited and can be suitably selected according to its kind and amount. For example, it may be advancedly contained in the monomeric mixture or aqueous medium, or may be added in lump or dropwise at the time of polymerization.

The emulsion (A) can be obtained by adding to an emulsion (I) prepared as in the above, a monomeric mixture (II) comprising the vinyl aromatic compound (c) and other polymerizable unsaturated monomer (d), and further emulsion polymerizing the whole.

The monomeric mixture (II) can suitably contain such components as polymerization initiator, chain transfer agent, reducing agent, emulsifier and the like as enumerated in the above, where necessary.

The monomeric mixture (II) may be added as it is, but generally it is desirably dispersed in an aqueous medium to form a monomeric emulsion and added in the form of the monomeric emulsion. The particle size of the monomeric emulsion in this case is not particularly limited.

As a polymerization method of the monomeric mixture (II), for example, the optionally emulsified monomeric mixture (II) is added to the emulsion (I) in lump or dropwise, and heated to a suitable temperature under stirring.

The emulsion resin (A) obtained as above can have a core/shell type multilayer structure in which the copolymer (I) formed from the monomeric mixture (I) comprising the polymerizable unsaturated monomer (a) and other polymerizable unsaturated monomer (b) serves as the core, and the copolymer (II) formed from the monomeric mixture (II) comprising the vinyl aromatic compound (c) and other polymerizable unsaturated monomer (d) serves as the shell.

Suitable ratio of the copolymer (I) to the copolymer (II) in the emulsion resin (A) lies within a range of, in terms of solid mass ratio of the copolymer (I)/copolymer (II), generally 10/90-90/10, in particular, 50/50-85/15, inter alia, 65/35-80/20, from the viewpoint of flip-flop property and metallic mottling of resulting coating film.

Thus obtained emulsion resin (A) has a form of fine particles dispersed in an aqueous medium, the particles having an average particle size within a range of generally 10-1,000 nm, in particular, 20-500 nm. The average particle size of the emulsion (A) is measured by Coulter Counter method at the measuring temperature of 20° C. This measurement can be conducted with, for example, COULTER N4 Model (tradename, Beckman Coulter, Inc.)

In the present invention, it is desirable to neutralize carboxyl groups in the emulsion resin (A) with a neutralizer, for improving mechanical stability of the particles of the emulsion resin (A). The neutralizer is subject to no limitation, so long as it can neutralize acidic groups. Examples of the neutralizer include sodium hydroxide, potassium hydroxide, trimethylamine, 2-(dimethylamino)ethanol, 2-amino-2-methyl-1-propanol, triethylamine, aqueous ammonia and the like. These neutralizers are desirably used in an amount to render pH of the emulsion resin after the neutralization around 6.5-9.0.

Melamine Resin (B)

The melamine resin (B) to be used in the water-based paint composition of the present invention is obtained by reaction of melamine with aldehyde, and includes both partially methylolated melamine resin and wholly methylolated melamine resin. Suitable melamine resin (B) has a relatively high molecular weight within a range of generally 1,000-5,000, preferably 1,200-4,000, inter alia, 2,000-3,000.

Examples of the aldehyde include formaldehyde, paraformaldehyde, acetaldehyde, benzaldehyde and the like, formaldehyde being particularly preferred. Also those methylolated melamine resins whose methylol groups are further partially or completely etherified with suitable alcohol are useful. Examples of alcohol useful for the etherification include methyl alcohol, ethyl alcohol, n-propyl alcohol, i-propyl alcohol, n-butyl alcohol, i-butyl alcohol, 2-ethylbutanol, 2-ethylhexanol and the like.

As the melamine resin (B), methyl-etherified melamine resins formed by partially or completely etherifying methylol groups of partially or wholly methylolated melamine resins with methyl alcohol, butyl-etherified melamine resins formed by partially or completely etherifying methylol groups of partially or wholly methylolated melamine resins with butyl alcohol; and methyl-butyl mixed-etherified melamine resins formed by partially or completely etherifying methylol groups of partially or wholly methylolated melamine resins with both methyl alcohol and butyl alcohol can be conveniently used.

Above-described melamine resins (B) can be used either alone or in combination of two or more.

"Weight-average molecular weight" in the present specification refers to the value measured with gel permeation chromatograph (tradename: HLC8120GPC, Tosoh Corporation) and converted based on weight-average molecular weight of polystyrene. In the measurement, four columns of TSKgel G-4000 HXL, TSKgel G-3000 HXL, TSKgel G-2500 HXL and TSKgel G-2000 HXL (tradenames, Tosoh Corporation) and the following conditions were used: mobile phase, tetrahydrofuran; set temperature, 40° C.; flow rate, 1 mL/min. and the detector, RI.

Hydrophobic Solvent (C)

The hydrophobic solvent (C) used in the water-based paint composition of the present invention is an organic solvent whose mass soluble in 100 g of water at 20° C. is not more than 10 g, preferably not more than 5 g, inter alia, not more than 1 g, examples of which include hydrocarbon solvents such as rubber gasoline, mineral spirit, toluol, xylol, solvent naphtha and the like; alcoholic solvents such as n-hexanol, n-octanol, 2-octanol, 2-ethylhexanol, n-decanol, benzyl alcohol, ethylene glycol 2-ethylhexyl ether, propylene glycol n-butyl ether, dipropylene glycol n-butyl ether, tripropylene glycol n-butyl ether, propylene glycol 2-ethylhexyl ether, propylene glycol phenyl ether and the like; ester solvents such as n-butyl acetate, isobutyl acetate, isoamyl acetate, methylamyl acetate, ethylene glycol acetate monobutyl ether; and ketone solvent such as methyl isobutyl ketone, cyclohexanone, ethyl n-amyl ketone, diisobutyl ketone and the like. These can be used either alone or in combination of two or more.

As the hydrophobic solvent (C), alcoholic solvent, in particular, $C_{7-14}$ alcohols, inter alia, at least one alcoholic solvent selected from the group consisting of 1-octanol, 2-octanol, 2-ethyl-1-hexanol, ethylene glycol 2-ethylhexyl ether, propylene glycol n-butyl ether and dipropylene glycol n-butyl ether, are preferred, in respect of flip-flop property and metallic mottling of resulting coating film.

Water-Based Paint Compositions

The water-based paint composition of the present invention can be formulated by uniformly mixing above-described emulsion resin (A), melamine resin (B) and hydrophobic solvent (C). The contents of the emulsion resin (A), melamine resin (B) and hydrophobic solvent (C) in the water-based paint composition can be within the following ranges, based on 100 mass parts of solid resin content of the water-based paint composition:

emulsion resin (A): 10-80 mass parts, preferably 15-50 mass parts, inter alia, 20-40 mass parts;
melamine resin (B): 5-50 mass parts, preferably 10-40 mass parts, inter alia, 20-30 mass parts;
hydrophobic solvent (C): 10-100 mass parts, preferably 20-80 mass parts, inter alia, 30-60 mass parts.

When the content of the emulsion resin (A) in the water-based paint composition deviates from the above range, flip-flop property or smoothness of resulting coating film become inferior, and when the content of the melamine resin (B) deviates from the above range, water resistance of the resulting coating film decreases. Furthermore, when the content of the hydrophobic solvent (C) deviates from the above range, the resulting coating film is apt to develop metallic mottling or have inferior flip-flop property or luster.

According to the present invention, the solid resin content in the water-based paint composition signifies the total solid content including, besides the solid resin contents of the emulsion resin (A), melamine resin (B) and modifying resin(s), that of the hardening agent which crosslinks with those resins, such as polyisocyanate compound, blocked polyisocyanate compound, epoxy group-containing compound, carboxyl group-containing compound, carbodiimido group-containing compound and the like.

The water-based paint composition of the present invention can contain as a resin component, besides the emulsion resin (A), modifying resin such as water-soluble or water-dispersible polyurethane resin, polyester resin, acrylic resin, alkyd resin, silicone resin, fluorine-containing resin, epoxy resin and the like. In particular, from the viewpoint of smoothness, luster and water-resistance, the composition preferably contains at least one modifying resin selected from the group consisting of water-soluble or water-dispersible polyester resin and water-soluble or water-dispersible acrylic resin.

Water-soluble or water-dispersible polyester resin can be obtained, for example, by neutralizing oil-free or oil-modified carboxyl group-containing polyester resin which is prepared through an esterification reaction of polyhydric alcohol with polybasic acid and, where necessary, monobasic acid, oil component and the like. This polyester resin preferably contains both hydroxyl groups and carboxyl groups, having a hydroxyl value within a range of generally 10-300 mgKOH/g, in particular, 50-250 mgKOH/g, inter alia, 80-180 mgKOH/g; and an acid value within a range of generally 1-200 mgKOH/g, in particular, 15-100 mgKOH/g, inter alia, 25-60 mgKOH/g. The polyester resin can have a weight-average molecular weight within a range of generally 500-100,000, preferably 1,000-80,000, in particular, 1,500-30,000, inter alia, 2,000-20,000. Carboxyl groups in the polyester resin can be neutralized with a basic substance. The basic substance is preferably water-soluble, specific examples including ammonia, methylamine, ethylamine, propylamine, butylamine, dimethylamine, trimethylamine, triethylamine, ethylenediamine, morpholine, 2-(methylamino)ethanol, 2-(dimethylamino)ethanol, diethanolamine, triethanolamine, diisopropanolamine, 2-amino-2-methylpropanol and the like. These can be used either alone or in combination of two or more.

The preferred blending amount of the water-soluble or water-dispersible polyester resin is normally within a range of 2-70 mass parts, in particular, 10-50 mass parts, inter alia, 15-40 mass parts, based on 100 mass parts of the solid resin content of the water-based paint composition.

As the water-soluble or water-dispersible acrylic resin, for example, carboxyl group-containing acrylic copolymers having a weight-average molecular weight within a range of 1,000-200,000, preferably 2,000-100,000, in particular, 3,000-80,000, inter alia, 5,000-70,000, which are obtained by copolymerization of a mixture comprising hydrophilic group-containing polymerizable unsaturated monomer(s) such as the earlier named carboxyl group-containing polymerizable unsaturated monomer (e), hydroxyl group-containing polymerizable unsaturated monomer(s) and other polymerizable unsaturated monomer(s) by means of solution polymerization method or the like. Carboxyl groups in the acrylic copolymer can be neutralized with a basic substance as earlier described. The acrylic resin preferably has a hydroxyl value within a range of generally 1-200 mgKOH/g, in particular, 2-100 mgKOH/g, inter alia, 3-60 mgKOH/g; and an acid value within a range of generally 1-200 mgKOH/g, in particular, 2-150 mgKOH/g, inter alia, 5-100 mgKOH/g.

Such modifying resins can be used either alone or in combination of two or more. The modifying resin can be blended in an amount within a range of generally 5-70 mass parts, preferably 10-60 mass parts, inter alia, 20-50 mass parts, per 100 mass parts of the solid resin content of the water-based paint composition.

Again, when the emulsion resin (A) and/or modifying resin contains crosslinkage functional groups such as hydroxyl group, carboxyl group, epoxy group and the like, the water-based paint composition of the present invention can contain, in addition to the melamine resin (B), a hardening agent having crosslinkable functional groups reactable with the functional groups. Examples of the hardening agent include amino resin, polyisocyanate compound, blocked polyisocyanate compound, epoxy group-containing compound, carboxyl group-containing compound, carbodiimido group-containing compound and the like. Of these, blocked polyisocyanate compound and carbodiimido group-containing compound are preferred.

As the blocked polyisocyanate compound, polyisocyanate compounds having at least two isocyanate groups per molecule, whose isocyanate groups being blocked with a blocking agent such as oxime, phenol, alcohol, lactam, mercaptan and the like can be used.

It is convenient to use such a hardening agent in an amount within a range of generally 1-40 mass parts, in particular, 5-20 mass pats, per 100 mass parts of the solid resin content of the water-based paint composition of the present invention.

The water-based paint composition of the present invention can furthermore contain effect pigment (D). Effect pigment (D) is a pigment which imparts to the coating film sparkling brilliance or pearlescent iridescent pattern. Specifically, for example, non-leafing or leafing aluminum (including vapor-deposited aluminum), copper, zinc, brass, nickel, aluminum oxide, mica, aluminum oxide coated with titanium oxide or iron oxide, mica coated with titanium oxide or iron oxide, and the like can be used. These effect pigments are preferably flaky.

As the effect pigment (D), those having the longitudinal dimension within a range of 1-100 µm, in particular, 5-40 µm, and the thickness, 0.0001-5 µm, in particular, 0.001-2 µm are preferred.

The effect pigment (D) can be blended within a range of generally 1-50 mass parts, preferably 5-35 mass parts, inter alia, 8-20 mass parts, per 100 mass parts of the solid resin content of the water-based paint composition of the present invention.

The water-based paint composition of the present invention furthermore preferably contains a thickener. Examples of the thickener include inorganic thickeners such as silicate, metal silicate, montmorillonite, organic montmorillonite, colloidal alumina and the like; polyacrylic acid-derived thickeners such as polyacrylic acid-(meth)acrylic acid ester copolymer, sodium polyacrylate (including commercialized products such as PRIMAL ASE-60, PRIMAL TT-615 and PRIMAL RM-5 of Rohm & Haas Co.; SN Thickener 613, SN Thickener 618, SN Thickener 630, SN Thickener 634, SN Thickener 636 of SAN NOPCO, Ltd.; all tradenames) and the like; association type thickeners having hydrophilic moiety and hydrophobic property within one molecule, which exhibit effective thickening action in an aqueous medium, the hydrophobic moieties adsorbing onto surfaces of the pigment or emulsion particles in the paint or mutually associating (including commercialized products such as UH-420, UH-450, UH-462, UH-472, UH-540, UH-752, UH-756 VF and UH-814N of ADEKA Corporation; PRIMAL RM-8W, PRIMAL RM-825, PRIMAL RM-2020 NPR, PRIMAL RM-12W and PRIMAL SCT-275 of Rhom & Haas Co.; SN Thickener 612, SN Thickener 621N, SN Thickener 625N, SN Thickener 627N and SN Thickener 660T of SAN NOPCO, Ltd., (all tradenames); cellulose derivative thickeners such as carboxymethyl cellulose, methyl cellulose, hydroxyethyl cellulose and the like; protein thickeners such as casein, sodium caseinate, ammonium caseinate and the like; alginic acid thickeners such as sodium alginate; polyvinyl thickeners such as polyvinyl alcohol, polyvinylpyrrolidone, polyvinyl benzyl ether copolymer and the like; polyether thickeners such as pluronic polyether, polyether dialkyl ester, polyether dialkyl ether, polyether epoxy modifications and the like; maleic anhydride copolymer thickeners such as partial ester of vinyl methyl ether-maleic anhydride copolymer; and polyamide thickeners such as polyamideamine salt and the like. These thickeners can be used either alone or in combination of two or more.

As the thickener, the polyacrylic acid thickeners and/or association type thickeners, in particular, association type thickeners, inter alia, urethane association type thickener having hydrophobic group at the terminals and containing urethane linkage in its molecular chain, are preferred. As such urethane association type thickeners, for example, UH-420, UH-462, UH-472, UH-540, UH-756 VF and UH-814N of ADEKA Corporation; SN Thickener 612, SN Thickener 621N, SN Thickener 625N, SN Thickener 627N and SN Thickener 660T of SAN NOPCO, Ltd. (all tradenames) can be named.

Where the water-based paint composition of the present invention contains a thickener as above, the amount of the thickener to be blended is suitably within a range of normally 0.01-10 mass parts, in particular, 0.05-3 mass parts, inter alia, 0.1-2 mass parts, per 100 mass parts of the solid resin content of the water-based paint composition of the present invention. Also when the composition contains as association type thickener, the amount of the association type thickener to be blended is suitably within a range of 0.01-10 mass parts, in particular, 0.05-2 mass parts, inter alia, 0.1-1 mass part, per 100 mass parts of the solid resin content of the water-based paint composition of the present invention.

The water-based paint composition of the invention can further contain, where necessary, conventional paint additives such as coloring pigment, extender, curing catalyst, UV absorber, light stabilizer, defoamer, plasticizer, organic solvent, surface regulating agent, antisettling agent and the like, either alone or in combination of two or more.

Examples of the coloring pigment include titanium dioxide, zinc flower, carbon black, molybdenum red, Prussian blue, cobalt blue, azo pigment, phthalocyanine pigment, quinacridone pigment, isoindoline pigment, vat pigment, perylene pigment and the like; and examples of extender include talc, clay, kaolin, baryta, barium sulfate, barium carbonate, calcium carbonate, silica, alumina white and the like.

Examples of the curing catalyst include sulfonic acids such as paratoluenesulfonic acid, dodecylbenzenesulfonic acid, dinonylnaphthalenesulfonic acid and the like, or salts of these acids with amines.

Coating Method

The water-based paint composition of the present invention is applicable to various coating objects. Coating objects to which the water-based paint composition of this invention is applicable are not particularly limited, while car bodies of various vehicles such as automobiles, two-wheelers, container cars and the like are preferred. The water-based paint composition of this invention is also applicable onto sheet steel such as cold-rolled steel sheet, zinc-plated steel sheet, zinc alloy plated steel sheet, stainless steel sheet, tin-plated steel sheet and the like; metal substrates such as aluminum plate, aluminum alloy plate and the like; and various plastic materials; which constitute those car bodies.

These coating objects may be given such surface treatment as phosphate treatment, chromate treatment, complex oxide treatment or the like in advance, and furthermore undercoating film such as of various electrocoating paints and/or intermediate coating film may be formed thereon.

Coating method of the water-based paint composition of the present invention is subject to no particular limitation and, for example, air spray coating, airless spray coating, rotary atomizing coating, curtain flow coating and the like may be used. Of these, air spray coating and rotary atomizing coating are preferred. Wet coating films can be formed by these means. These coating methods may be practiced under impression of static electricity, where necessary. While the application amount of the water-based paint composition is variable depending on utility of the coated object, for example, normally an amount to provide a hardened coating film thickness of around 5-70 μm is preferred.

Hardening of wet coating film can be effected by heating, after applying a water-based paint composition onto a coating object. Heating can be given by per se known heating means, for example, drying oven such as hot air oven, electric oven or infrared ray induction heating oven. Suitable heating temperature normally ranges 80-180° C., preferably 100-160° C. While the heating time is not critical, it can be normally around 20-40 minutes.

The water-based paint composition of the present invention can be conveniently used as automobile paint, in particular, as water-based base coat paint in a coating method in which the object is applied with a base coat paint containing effect pigment and/or coloring pigment and then applied with a clear paint.

In the occasions of using the water-based paint composition of the present invention as such water-based base coat paint, multilayer coating film can be formed by 2-coat-1-bake system, in which, for example, a water-based paint composition of the invention is applied onto an electrocoated and/or intermediate coated object and, without hardening the formed coating film, a clear paint is applied onto the unhardened coating film, followed by hardening the unhardened coating film and the clear coating film simultaneously by heating. The "unhardened coating film" includes set-to-touch film and dry-to-touch film.

In case of applying a water-based paint composition of the present invention by 2-coat-1-bake system, the water-based paint composition is suitably coated to provide a dry film thickness within a range of normally 5-40 μm, preferably 10-30 μm, inter alia, 10-20 μm; and the clear paint is suitably applied to a dry film thickness within a range of 10-80 μm, in particular, 15-60 μm. Also after applying the water-based paint composition, the coating film is preferably given a preheating at room temperature—100° C., preferably 40-90° C., for 1-15 minutes. Furthermore, after applying the clear paint, an interval of 1-60 minutes can be provided at room temperature, or a preheating at about 40-80° C. for 1-60 minutes can be given, where necessary.

Hardening of coating films of the water-based paint composition of the invention and the clear paint can be effected by heating means known per se as earlier described. Specifically, it is suitable to simultaneously harden the two coating films, by heating at temperatures of 80-180° C., preferably 100-160° C., for around 10-40 minutes.

It is also possible to form multilayer coating film by 3-coat-1-bake system, in which an intermediate paint is applied onto a coating object; without hardening the formed coating film, a water-based paint composition of the present invention as a water-based base coat paint is applied onto the unhardened intermediate coating film; without hardening the formed coating film, a clear paint is applied onto the unhardened base coat coating film; and the three layered film of the intermediate paint, base coat paint and clear paint is simultaneously hardened by heating.

When a water-based paint composition of the invention is used in the above 3-coat-1-bake system, preferably the intermediate paint is applied to a dry film thickness of 10-60 μm, in particular, 20-40 μm; the water-based paint composition of the invention is applied to a dry film thickness of 5-40 μm, in particular, 10-30 μm, inter alia, 10-20 μm; and the clear paint, to a dry film thickness of 10-80 μm, in particular, 15-60 μm. Where a water-based paint is used as the intermediate paint, it is recommendable to give a preheating after application of the intermediate paint, at room temperature—100° C., preferably 40-90° C., for 1-15 minutes. Also after the application of the water-based paint composition of the invention, it is recommendable to give a preheating at room temperature—100° C., preferably 40-90° C., for 1-15 minutes. Furthermore, after application of the clear paint, where necessary, an interval of 1-60 minutes at room temperature or a preheating at about 40-80° C. for 1-60 minutes can be given.

Hardening of the coating film can be effected by heating means known per se as earlier described. Specifically, for example, it is suitable to simultaneously harden the three-layered film by heating at temperatures of 80-180° C., preferably 100-160° C., for around 10-40 minutes.

As the intermediate paint, per se known thermosetting intermediate paint can be used. More specifically, for example, a paint comprising base resin such as alkyd resin, polyester resin, acrylic resin, urethane resin and the like, and a hardening agent having groups reactable with the reactive functional groups contained in the base resin, such as amino resin, polyisocyanate compound, blocked polyisocyanate compound and the like in suitable combination can be used. As the intermediate paint, in consideration of environmental problems and resource saving, high-solid paint, water-based paint, powder paint and the like which use little organic solvent can be favorably used.

As the clear paint, those known per se, which are customarily used for coating automobile bodies can be used. Specifically, for example, organic solvent-based thermosetting paint, water-based thermosetting paint, thermosetting powder paint and the like can be named, which comprise as resin components a base resin such as acrylic resin, polyester resin, alkyd resin, urethane resin, epoxy resin, fluorine-containing resin and the like, having crosslinkable functional groups such as hydroxyl, carboxyl, epoxy, silanol or the like groups; and hardening agent such as melamine resin, urea resin, optionally blocked polyisocyanate compound, carboxyl-containing compound or resin, epoxy-containing compound or resin. Of these, thermosetting paint comprising hydroxyl-containing acrylic resin and melamine resin, thermosetting paint comprising carboxyl-containing resin and epoxy-containing resin, and thermosetting paint comprising hydroxyl-containing resin and optionally blocked polyisocyanate compound, are preferred.

The clear paint may be one-package type or two-package type like two-package type urethane resin paint.

The clear paint may also contain, where necessary, coloring pigment, effect pigment, dye and the like to an extent not interfering with its transparency, and furthermore can suitably contain extender, ultraviolet absorber, defoamer, thickener, rust proofing agent, surface regulating agent and the like.

EXAMPLES

Hereinafter the invention is explained more specifically, referring to working Examples and Comparative Examples, it being understood that the invention is not limited to these Examples only. "Part" and "%" are invariably by mass.

Production Examples of Emulsion Resin (A)

Production Example 1

A reactor equipped with a thermometer, thermostat, stirrer, reflux condenser and dropping device was charged with 130 parts of deionized water and 0.52 part of AQUALON KH-10 (note 1) which were stirred and mixed in a nitrogen gas current, and heated to 80° C. Then 1% of the total amount of the following monomeric emulsion (1) and 5.3 parts of 6% aqueous ammonium persulfate solution were introduced into the reactor and kept at 80° C. for 15 minutes. The remainder of the monomeric emulsion (1) was dropped into the reactor which was maintained at the same temperature, over 3 hours, followed by 1 hour's aging. Then the following monomeric emulsion (2) was added dropwise over an hour, aged for another hour and, while gradually adding 40 parts of 5.0% aqueous dimethylethanolamine solution into the reactor, the content was cooled to 30° C. Then the reaction mixture was discharged while being filtered through 100-meth Nylon cloth, to provide an emulsion resin (A1) having an average particle size of 100 nm [as measured with a submicron particle size distribution measuring device, COULTER N4 Model (tradename, Beckman Coulter, Inc.) as to the sample diluted with deionized water, at 20° C.], an acid value of 33 mgKOH/g, hydroxyl value of 25 mgKOH/g and solid content of 30%.

(Note 1) AQUALON KH-10: tradename, Daiichi Kogyo Seiyaku Co., Ltd., polyoxyethylene alkylether sulfate ester ammonium salt, active ingredient 97%

Monomeric emulsion (1): The monomeric emulsion (1) was obtained by mixing by stirring 42 parts of deionized water, 0.72 part of AQUALON KH-10, 2.1 parts of allyl methacrylate, 2.8 parts of styrene, 16.1 parts of methyl methcaylate, 28 parts of ethyl acrylate and 21 parts of n-butyl acrylate.

Monomeric emulsion (2): The monomeric emulsion (2) was obtained by mixing by stirring 18 parts of deionized water, 0.31 part of AQUALON KH-10, 0.03 part of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate and 9 parts of n-butyl acrylate.

Production Examples 2-14

Using the components of each indicated amount as given in the following Table 1, emulsion resins (A2)-(A14) were obtained by the operations similar to those of Production Example 1. The solid content, acid value and hydroxyl value of the emulsion resins (A1)-(A14) were as shown in the following Table 1, concurrently with the result of the Production Example 1.

TABLE 1

| | | | Production Example | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| Emulsion resin (A) | | | A1 | A2 | A3 | A4 | A5 | A6 | A7 | A8 | A9 | A10 | A11 | A12 | A13 | A14 |
| Deionized water | | | 130 | | | | | | | | | | | | | |
| AQUALON KH-10 (note 1) | | | 0.52 | | | | | | | | | | | | | |
| Deionized water | | | 5 | | | | | | | | | | | | | |
| Ammonium persulfate | | | 0.3 | | | | | | | | | | | | | |
| Monomeric Emulsion (1) | deionized water | | 42 | | | | | | | | | | | | | |
| | AQUALON KH-10 (note 1) | | 0.72 | | | | | | | | | | | | | |
| | monomer (a) | allyl methacrylate | 2.1 | 2.1 | | | | | | 2.3 | 2.3 | 2.3 | | | 2.1 | 2.1 |
| | | methylenebis-acrylamide | | | 2.1 | 2.1 | 2.1 | 2.1 | 2.1 | 1.5 | 1.5 | 1.5 | 1.5 | | | |
| | monomer | acrylamide | | | | | | | | | | | | 2.1 | | |
| | (b) | styrene | 2.8 | 2.8 | 2.8 | 2.8 | 2.8 | 2.8 | 2.8 | 5.3 | 5.3 | 5.3 | 6.8 | 2.8 | 2.8 | 2.8 |
| | | methyl methacrylate | 16.1 | 16.1 | 16.1 | 16.1 | 16.1 | 16.1 | 16.1 | 44 | 44 | 44 | 18 | 16.1 | 16.1 | 16.1 |
| | | ethyl acrylate | 28 | 28 | 28 | 28 | 28 | 28 | 28 | 11.3 | 11.3 | 11.3 | 26 | 28 | 28 | 28 |
| | | n-butyl acrylate | 21 | 21 | 21 | 21 | 21 | 21 | 21 | 10 | 10 | 10 | 22.5 | 21 | 21 | 21 |
| Monomeric Emulsion (2) | deionized water | | 18 | | | | | | | | | | | | | |
| | AQUALON KH-10 (note 1) | | 0.31 | | | | | | | | | | | | | |
| | ammonium persulfate | | 0.03 | | | | | | | | | | | | | |
| | monomer (c) | styrene | 3 | 6 | 3 | 3 | 3 | 3 | 3 | 3 | 3 | 3 | 2.3 | 3 | | |
| | monomer (d) | methyl methacrylate | 6 | 6 | 6 | 6 | 6 | 6 | 6 | 5 | 5 | 5 | 4.8 | 6 | 6 | 6 |
| | | allyl methacrylate | | | | | | | 1 | | | | | | | |
| | | 2-ethylhexyl acrylate | | | | | | | | 9 | | 4 | 6 | | | |
| | | stearyl acrylate | | | | | | | | | | | | | 3 | |
| | monomer (e) | methacrylic acid | 5.1 | 5.1 | 5.1 | 10.2 | 5.1 | 5.1 | 5.1 | 3.3 | 3.3 | 3.4 | 4.3 | 5.1 | 5.1 | 5.1 |

TABLE 1-continued

|  |  | Production Example | | | | | | | | | | | | | |
|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 |
| Emulsion resin (A) | | A1 | A2 | A3 | A4 | A5 | A6 | A7 | A8 | A9 | A10 | A11 | A12 | A13 | A14 |
| monomer (f) | 2-hydroxyethyl acrylate | 5.1 | 5.1 | 5.1 | 5.1 | 10.2 | 5.1 | 5.1 | 2.3 | 2.3 | 2.3 | 2 | 5.1 | 5.1 | 5.1 |
| monomer (g) | ethyl acrylate | 1.8 | 1.8 | 1.8 | 1.8 | 1.8 | 1.8. | 1.8 | | | | 6.8 | 1.8 | 1.8 | 1.8 |
| | n-butyl acrylate | 9 | 6 | 9 | 3.9 | 3.9 | 8 | 0 | 12 | 8 | 6 | 5 | 9 | 9 | 12 |
| 5% Aqueous dimethylethanolamine solution | | | | | | | | 40 | | | | | | | |
| Solid content (mass %) | | | | | | | | 30 | | | | | | | |
| Acid value (mgKOH/g) | | 33 | 33 | 33 | 67 | 33 | 33 | 33 | 21 | 21 | 21 | 28 | 33 | 33 | 33 |
| Hydroxyl value (mgKOH/g) | | 25 | 25 | 25 | 25 | 49 | 25 | 25 | 11 | 11 | 11 | 10 | 25 | 25 | 25 |

Production Examples of Polyester Resin Solution

Production Example 15

A reactor equipped with a thermometer, thermostat, stirrer, reflux condenser and water separator was charged with 109 parts of trimethylolpropane, 141 parts of 1,6-hexanediol, 126 parts of hexahydrophthalic anhydride and 120 parts of adipic acid. After raising their temperature from 160° C. to 230° C. over 3 hours, the components were subjected to condensation reaction at 230° C. for 4 hours. Then further 38.3 parts of trimellitic anhydride was added and reacted at 170° C. for 30 minutes to introduce carboxyl groups into the condensation reaction product. Diluting the resulting product with 2-ethyl-1-hexanol (whose mass soluble in 100 g of water at 20° C.: 0.1 g), polyester resin solution (PE1) having an acid value of 46 mgKOH/g, hydroxyl value of 150 mgKOH/g, solid content of 70% and weight-average molecular weight of 6,400 was obtained.

Production Example 16

Production Example 15 was repeated except that the diluting solvent, 2-ethyl-1-hexanol, was replaced with dipropylene glycol n-propyl ether (whose mass soluble in 100 g of water at 20° C.: 19 g), to provide polyester resin solution (PE2).

Production Example 17

Production Example 15 was repeated except that the diluting solvent, 2-ethyl-1-hexanol, was replaced with ethylene glycol monobutyl ether (whose mass soluble in 100 g of water at 20° C.: unlimited), to provide polyester resin solution (PE3).

Production Example of Acrylic Resin Solution

Production Example 18

A reactor equipped with a thermometer, thermostat, stirrer and dropping device was charged with 35 parts of propylene glycol monopropyl ether and its temperature was raised to 85° C. Then a mixture of 30 parts of methyl methacrylate, 20 parts of 2-ethylhexyl acrylate, 29 parts of n-butyl acrylate, 15 parts of hydroxyethyl acrylate, 6 parts of acrylic acid, 15 parts of propylene glycol monopropyl ether and 2.3 parts of 2,2'-azobis (2,4-dimethyl-valeronitrile) was dropped into the flask over 4 hours, followed by an hour's aging. Thereafter further a mixture of 10 parts of propylene glycol monopropyl ether and 1 part of 2,2'-azobis(2,4-dimethyl-valeronitrile) was dropped into the flask over an hour, followed by another hour's aging. Adding 7.4 parts of diethanolamine, an acrylic resin solution having a solid content of 55%, weight-average molecular weight of 58,000, acid value of 47 mgKOH/g and hydroxyl value of 72 mgKOH/g was obtained.

Production Examples of Effect Pigment Concentrate

Production Example 19

In an agitation mixing vessel, 19 parts of an aluminum pigment paste, GX-180A (tradename, Asahikasei Metals Co., Ltd., metal content 74%), 35 parts of 2-ethyl-1-hexanol, 8 parts of phosphoric acid group-containing resin solution (note 2) and 0.2 part of 2-(dimethylamino)ethanol were uniformly mixed to provide effect pigment concentrate (P1).

(Note 2) phosphoric acid group-containing resin solution:
  A reactor equipped with a stirrer, thermostat and cooler was charged with a mixed solvent of 27.5 parts of methoxypropanol and 27.5 parts of isobutanol, which was heated to 110° C. To this mixed solvent, 121.5 parts of a mixture consisting of 25 parts of styrene, 27.5 parts of n-butyl methacrylate, 20 parts of Isostearyl Acrylate (tradename, Osaka Organic Chemical Industry, Ltd., a branched higher alkyl acrylate), 7.5 parts of 4-hydroxybutyl acrylate, 15 parts of phosphoric acid group-containing polymerizable monomer (note 3), 12.5 parts of 2-methacryloyloxyethyl acid phosphate, 10 parts of isobutanol and 4 parts of t-butylperoxyoctanoate was added over 4 hours, and further a mixture of 0.5 part of t-butylperoxyoctanoate and 20 parts of isopropanol was added dropwise over an hour, followed by another hour's aging under stirring. Thus a phosphoric acid group-containing resin solution having a solid content of 50% was obtained. The acid value of this resin attributable to the phosphoric acid groups was 83 mgKOH/g, hydroxyl value was 29 mgKOH/g, and weight-average molecular weight was 10,000.

(Note 3) phosphoric acid group-containing polymerizable monomer: A reactor equipped with a stirrer, thermostat and cooler was charged with 57.5 parts of monobutylphosphoric acid and 41 parts of isobutanol, which were heated to 90° C. Thereafter 42.5 parts of glycidyl methacrylate was added dropwise over 2 hours, followed by an hour's aging under stirring. Further adding 59 parts of isopropanol, a phosphoric acid group-containing polymerizable monomer solution having a solid content of 50% was obtained. The acid value of the monomer attributable to the phosphoric acid group was 285 mgKOH/g.

Production Example 20

Production Example 19 was repeated except that 35 parts of the 2-ethyl-1-hexanol was replaced with 35 parts of dipropylene glycol n-propyl ether, to provide effect pigment concentrate (P2).

Production Example 21

Production Example 19 was repeated except that 35 parts of the 2-ethyl-1-hexanol was replaced with 35 parts of ethylene glycol monobutyl ether, to provide effect pigment concentrate (P3).

Examples of Water-Based Paint Compositions

Example 1

Uniformly-mixing 100 parts of the emulsion resin (A1) as obtained in Example 1, 50 parts of melamine resin (B1) (a methyl-butyl mixed-etherified melamine resin, solid content 60%, weight-average molecular weight, 2,000), 57 parts of the polyester resin (PE1) as obtained in Production Example 15 and 62 parts of the effect pigment concentrate (P1) as obtained in Production Example 19, and adding thereto deionized water and 2-(dimethylamino)ethanol, water-based paint composition (X1) having a pH of 8.0 and solid content of 23% was obtained.

Examples 2-14, Comparative Examples 1-6

Those components and their amounts as indicated in Example 1 were changed as shown in Table 2, and otherwise Example 1 was repeated, to provide water-based paint compositions (X2)-(X20) each having a pH of 8.0 and solid content of 23%.

TABLE 2

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | |
| Water-based paint composition | | X1 | X2 | X3 | X4 | X5 | X6 | X7 | X8 | X9 | X10 | X11 | |
| Emulsion resin (A) | A1 | 100 | | | | | | | | | | | |
| | A2 | | 100 | | | | | | | | | | |
| | A3 | | | 100 | | | | | | | | | |
| | A4 | | | | 100 | | | | | | | | |
| | A5 | | | | | 100 | | | | | | | |
| | A6 | | | | | | 100 | | | | | | |
| | A7 | | | | | | | 100 | | | | | |
| | A8 | | | | | | | | 100 | | | | |
| | A9 | | | | | | | | | 100 | | | |
| | A10 | | | | | | | | | | 100 | | |
| | A11 | | | | | | | | | | | 100 | |
| | A12 | | | | | | | | | | | | |
| | A13 | | | | | | | | | | | | |
| | A14 | | | | | | | | | | | | |
| Melamine resin (B) | B1 | 50 | 50 | 50 | 50 | 50 | 50 | 50 | 50 | 50 | 50 | 50 | |
| | B2 (note 4) | | | | | | | | | | | | |
| | B3 (note 5) | | | | | | | | | | | | |
| Polyester resin solution | PE1 | 57 | 57 | 57 | 57 | 57 | 57 | 57 | 43 | 57 | 43 | 43 | |
| | EE2 | | | | | | | | | | | | |
| | PE3 | | | | | | | | | | | | |
| Acrylic resin solution | | | | | | | | | 18 | | 18 | 18 | |
| Effect pigment concentrate | P1 | 62 | 62 | 62 | 62 | 64 | 62 | 62 | 62 | 62 | 62 | 62 | |
| | P2 | | | | | | | | | | | | |
| | P3 | | | | | | | | | | | | |

| | | Example | | | Comparative Example | | | | | |
|---|---|---|---|---|---|---|---|---|---|---|
| | | 12 | 13 | 14 | 1 | 2 | 3 | 4 | 5 | 6 |
| Water-based paint composition | | X12 | X13 | X14 | X15 | X16 | X17 | X18 | X19 | X20 |
| Emulsion resin (A) | A1 | | | | | | | 100 | 100 | 100 |
| | A2 | | | | | | | | | |
| | A3 | 100 | 233 | 100 | | | | | | |
| | A4 | | | | | | | | | |
| | A5 | | | | | | | | | |
| | A6 | | | | | | | | | |
| | A7 | | | | | | | | | |
| | A8 | | | | | | | | | |
| | A9 | | | | | | | | | |
| | A10 | | | | | | | | | |
| | A11 | | | | | | | | | |
| | A12 | | | | 100 | | | | | |
| | A13 | | | | | 100 | | | | |
| | A14 | | | | | | 100 | | | |
| Melamine resin (B) | B1 | 59 | 50 | | 50 | 50 | 50 | | 50 | 50 |
| | B2 (note 4) | | | 38 | | | | | | |
| | B3 (note 5) | | | | | | | 38 | | |

TABLE 2-continued

| | | | | | | | | | | |
|---|---|---|---|---|---|---|---|---|---|---|
| Polyester resin solution | PE1 | 29 | | 57 | 57 | 57 | 57 | 57 | | |
| | EE2 | | | | | | | | 57 | |
| | PE3 | | | | | | | | | 57 |
| Acrylic resin solution | | | 36 | | | | | | | |
| Effect pigment concentrate | P1 | 62 | 62 | 62 | 62 | 62 | 62 | 62 | | |
| | P2 | | | | | | | | 62 | |
| | P3 | | | | | | | | | 62 |

(Note 4)
Melamine resin (B2): a methyl-butyl mixed etherified melamine resin, solid content 80%, weight-average molecular weight 1,200.
(Note 5)
Melamine resin (B3): a methyl-etherified melamine resin, solid content 80%, weight-average molecular weight 800.

Coating Film-Forming Method (Preparation of Test Panels)

With each of the water-based paint compositions (X1)-(X20) as obtained in above Examples 1-14 and Comparative Examples 1-6, respective test panels were prepared as follows, and their evaluation tests were conducted.

(Preparation of Coating Objects for the Test)

Zinc phosphate-treated, cold-rolled steel sheets (45 cm-long, 30 cm-wide and 0.8 mm-thick) were electrocoated with ELECRON GT-10 (tradename, Kansai Paint Co., thermosetting epoxy resin-type cationic electrodeposition paint) to a dry film thickness of 20 μm which was then cured by heating at 170° C. for 30 minutes, onto which an intermediate paint, AMILAC TP-65-2 (tradename, Kansai Paint Co., polyester resin-amino resin type organic solvent-based intermediate paint) was applied to a dry film thickness of 40 μm. Curing the film at 140° C. for 30 minutes, the coating objects were provided.

Example 15

In a coating environment of temperature 23° C. and humidity 75%, the water-based paint composition (X1) as obtained in Example 1 was applied with a rotary atomizing type bell-formed coating machine, ABB Metallic Bell Coater (tradename, ABB Co.) onto the coating object to a dry film thickness of 15 μm. Allowing the object to stand for 2 minutes, the coating film—was preheated at 80° C. for 3 minutes. Then onto the uncured coated surface, MAGICRON KINO-1210 (tradename, Kansai Paint Co., acrylic resin type solvent-based top clear paint) was applied to a dry film thickness of 40 μm, left to stand for 7 minutes, and heated at 140° C. for 30 minutes. Whereby the two coating films were simultaneously cured to provide a test panel.

Examples 16-28, Comparative Examples 7-12

Except that the water-based paint composition (X1) in Example 15 was replaced with those water-based paint compositions as given in Table 3, test panels of Examples 16-28 and Comparative Examples 7-12 were prepared in the manner similar to Example 15.

Evaluation Tests

Each of the test panels as obtained in above Examples 15-28 and Comparative Examples 7-12 were evaluated by the following test methods. The results of the evaluation were as given in Table 3.

(Test Methods)

Flip-flop property: Each of the test panels was visually observed at different angles, and its flip-flop property was evaluated according to the following standard.

⊚: The color tone change depending on the visual observation angle was very great, indicating very excellent flip-flop property.

◯: The color tone change depending on the visual observation angle was great, indicating excellent flip-flop property.

Δ: The color tone change depending on the visual observation angle was rather small, indicating rather inferior flip-flop property.

x: The color tone change depending on the visual observation angle was small, indicating inferior flip-flop property.

Metallic mottling: Each test panel was visually observed, and metallic mottling was evaluated according to the following standard.

⊚: No metallic mottling was recognized.

◯: Nearly no metallic mottling was recognized.

Δ: A little metallic mottling was recognized.

x: Much metallic mottling was recognized.

Smoothness: Appearance of each test panel was evaluated by visual observation according to the following standard:

⊚: very excellent smoothness

◯: excellent smoothness

Δ: rather inferior smoothness x: inferior smoothness.

Luster: Appearance of each test panel was evaluated by visual observation according to the following standard.

⊚: very excellent luster

◯: excellent luster

Δ: rather inferior luster x: inferior luster.

Water resistance: The test panels were immersed in 40° C. warm water for 240 hours, withdrawn and dried at 20° C. for 12 hours. The multilayer coating film on each test panel was crosscut with a cutter to the depth reaching the substrate, to form one-hundred 2 mm×2 mm squares. Then an adhesive cellophane tape was stuck thereon, and rapidly peeled off at 20° C. The remaining condition of the crosscut coating film was examined.

⊚: One-hundred squares of the coating film remained, and no minor peeling off of the coating film at the cut-in edges with the cutter was caused.

◯: One-hundred squares of the coating film remained but minor peeling off of the coating film at the cut-in edges with the cutter was observed.

Δ: Remaining number of the squares was 90-99.

x: Remaining number of the squares was not more than 89.

TABLE 3

| | Water-based paint composition | Evaluation Result | | | | |
|---|---|---|---|---|---|---|
| | | flip-flop property | metallic mottling | smoothness | luster | water resistance |
| Example 15 | X1 | ○ | ○ | ⊙ | ⊙ | ⊙ |
| 16 | X2 | ⊙ | ○ | ⊙ | ⊙ | ⊙ |
| 17 | X3 | ○ | ⊙ | ⊙ | ⊙ | ⊙ |
| 18 | X4 | ○ | ⊙ | ⊙ | ○ | ○ |
| 19 | X5 | ○ | ⊙ | ⊙ | ○ | ○ |
| 20 | X6 | ○ | ○ | ○ | ○ | ⊙ |
| 21 | X7 | ○ | ○ | ○ | ○ | ⊙ |
| 22 | X8 | ⊙ | ⊙ | ○ | ⊙ | ⊙ |
| 23 | X9 | ○ | ⊙ | ○ | ⊙ | ⊙ |
| 24 | X10 | ⊙ | ⊙ | ○ | ○ | ○ |
| 25 | X11 | ⊙ | ⊙ | ⊙ | ⊙ | ⊙ |
| 26 | X12 | ⊙ | ⊙ | ⊙ | ⊙ | ⊙ |
| 27 | X13 | ○ | ⊙ | ○ | ○ | ○ |
| 28 | X14 | ○ | ⊙ | ⊙ | ○ | ○ |
| Comparative Example 7 | X15 | X | X | X | Δ | ○ |
| 8 | X16 | X | X | X | Δ | ○ |
| 9 | X17 | X | X | X | Δ | ○ |
| 10 | X18 | X | X | Δ | X | X |
| 11 | X19 | X | X | Δ | X | ○ |
| 12 | X20 | X | X | Δ | X | ○ |

The invention claimed is:

1. A water-based paint composition comprising an emulsion resin (A), melamine resin (B) and hydrophobic solvent (C), wherein:
the emulsion resin (A) is fine resin particles having core/shell type multilayered structure composed of the core made of a copolymer (I) obtained by copolymerization of 0.1-30 mass % of polymerizable unsaturated monomer (a) having at least two polymerizable unsaturated groups per molecule and 70-99.9 mass % of other polymerizable unsaturated monomer (b), and the shell made of a copolymer (II) obtained by copolymerization of 5-50 mass % of vinyl aromatic compound (c) and 50-95 mass % of other polymerizable unsaturated monomer (d), wherein the solid mass ratio of the copolymer (I)/copolymer (II) is within a range of 10/90-90/10;
the melamine resin (B) has a weight-average molecular weight within a range of 1,000-5,000;
the hydrophobic solvent (C) is an alcoholic solvent; and
the water-based paint composition comprises the emulsion resin (A) within a range of 10-80 mass parts, the melamine resin (B) within a range of 5-50 mass parts, and the hydrophobic solvent (C) within a range of 10-100 mass parts, per 100 mass parts of solid resin content in the water-based paint composition.

2. The water-based paint composition according to claim 1, wherein the polymerizable unsaturated monomer (a) contains an amido group.

3. The water-based paint composition according to claim 1, wherein the vinyl aromatic compound (c) is styrene.

4. The water-based paint composition according to claim 1, wherein the other polymerizable unsaturated monomer (d) contains, as at least a part thereof, 1-40 mass % of carboxyl group-containing polymerizable unsaturated monomer (e), based on the total mass of the vinyl aromatic compound (c) and other polymerizable unsaturated monomer (d).

5. The water-based paint composition according to claim 1, wherein the other polymerizable unsaturated monomer (d) contains, as at least a part thereof, 1-40 mass % of hydroxyl group-containing polymerizable unsaturated monomer (f), based on the total mass of the vinyl aromatic compound (c) and other polymerizable unsaturated monomer (d).

6. The water-based paint composition according to claim 1, wherein the other polymerizable unsaturated monomer (d) contains, as at least a part thereof, 15-93 mass % of alkyl (meth)acrylate (g) having a $C_{2-4}$ alkyl group, based on the total mass of the vinyl aromatic compound (c) and other polymerizable unsaturated monomer (d).

7. The water-based paint composition according to claim 1, wherein the copolymer (II) is obtained by copolymerizing 9-25 mass % of the vinyl aromatic compound (c), 6-25 mass % of carboxyl group-containing polymerizable unsaturated monomer (e), 5-20 mass % of hydroxyl group-containing polymerizable unsaturated monomer (f) and 30-80 mass % of alkyl (meth)acrylate (g) having a $C_{2-4}$ alkyl group, based on the total mass of the used monomers.

8. The water-based paint composition according to claim 1, wherein the shell of the copolymer (II) is uncrosslinked.

9. The water-based paint composition according to claim 1, wherein the emulsion resin (A) has an acid value within a range of 5-90 mgKOH/g and a hydroxyl value within a range of 1-70 mgKOH/g.

10. The water-based paint composition according to claim 1, wherein the solid mass ratio of the copolymer (I)/copolymer (II) is within a range of 50/50-85/15.

11. The water-based paint composition according to claim 1, wherein the emulsion resin (A) is obtained by adding to an emulsion resulting from emulsion polymerization of a monomeric mixture (I) comprising 0.1-30 mass % of polymerizable unsaturated monomer (a) having at least two polymerizable unsaturated groups per molecule and 70-99.9 mass % of other polymerizable unsaturated monomer (b), a monomeric mixture (II) comprising 5-50 mass % of vinyl aromatic compound (c) and 50-95 mass % of other polymerizable unsaturated monomer (d); and further continuing emulsion polymerization.

12. The water-based paint composition according to claim 1, comprising 15-50 mass parts of the emulsion resin (A), 10-40 mass parts of the melamine resin (B) and 20-80 mass parts of the hydrophobic solvent (C), per 100 mass parts of the solid resin content of the water-based paint composition.

13. The water-based paint composition according to claim 1, further comprising at least one modifying resin selected from the group consisting of water-soluble or water-dispersible polyester resins and water-soluble or water-dispersible acrylic resins.

14. The water-based paint composition according to claim 1, further comprising effect pigment (D).

15. An article coated with the water-based paint composition as described in any one of claims 1-13.

16. A method of forming multilayer coating film comprising applying the water-based paint composition as described in any one of claims 1-13 onto a coating object, applying onto the resulting uncured coating film a clear paint, and thereafter heating to cure the two-layered coating film simultaneously.

17. An article coated by the method as described in claim 16.

18. A water-based paint composition comprising an emulsion resin (A), melamine resin (B) and hydrophobic solvent (C), wherein:
the emulsion resin (A) comprises the one which is obtained by adding, to an emulsion comprising a copolymer (I) obtained by emulsion polymerizing a monomeric mixture containing 0.1-30 mass % of polymerizable unsaturated monomer (a) having at least two polymerizable unsaturated groups per molecule and 70-99.9 mass % of other polymerizable unsaturated monomer (b), a monomeric mixture comprising 5-50 mass % of vinyl aromatic compound (c) and 50-95 mass % of other polymerizable unsaturated monomer (d); and further continuing emulsion polymerization to form a copolymer (II); wherein the solid mass ratio of the copolymer (I)/copolymer (II) is within a range of 10/90-90/10;

the melamine resin (B) has a weight-average molecular weight within a range of 1,000-5,000;

the hydrophobic solvent (C) is an alcoholic solvent; and the water-based paint composition comprises the emulsion resin (A) within a range of 10-80 mass parts, the melamine resin (B) within a range of 5-50 mass parts, and the hydrophobic solvent (C) within a range of 10-100 mass parts, per 100 mass parts of solid resin content in the water-based paint composition.

* * * * *